US 12,107,740 B2

(12) United States Patent
Maino et al.

(10) Patent No.: US 12,107,740 B2
(45) Date of Patent: Oct. 1, 2024

(54) INFRASTRUCTURE FOR ENFORCING PER-APPLICATION TARGET SERVICE LEVEL PARAMETERS IN MULTI-DOMAIN NETWORKS

(71) Applicant: Cisco Technology, Inc., San Jose, CA (US)

(72) Inventors: Fabio R. Maino, Palo Alto, CA (US); Saswat Praharaj, Pleasanton, CA (US); Alberto Rodriguez-Natal, Leon (ES); Pradeep K. Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 69 days.

(21) Appl. No.: 18/161,162

(22) Filed: Jan. 30, 2023

(65) Prior Publication Data
US 2024/0259278 A1    Aug. 1, 2024

(51) Int. Cl.
*H04L 41/5019*     (2022.01)
*H04L 41/046*      (2022.01)

(52) U.S. Cl.
CPC ........ *H04L 41/5019* (2013.01); *H04L 41/046* (2013.01)

(58) Field of Classification Search
CPC .......................... H04L 41/5019; H04L 41/046
See application file for complete search history.

(56) References Cited

U.S. PATENT DOCUMENTS

| | | | |
|---|---|---|---|
| 6,728,748 B1 * | 4/2004 | Mangipudi | H04L 43/0811 718/105 |
| 8,429,097 B1 * | 4/2013 | Sivasubramanian | G06F 16/2282 706/12 |
| 8,572,235 B1 * | 10/2013 | Eslambolchi | H04L 41/22 709/224 |
| 2010/0064184 A1 | 3/2010 | Almeida et al. | |
| 2015/0089057 A1 | 3/2015 | Ravindran et al. | |
| 2015/0180736 A1 | 6/2015 | Leung | |
| 2015/0263906 A1 | 9/2015 | Kasturi et al. | |
| 2021/0266262 A1 | 8/2021 | Subramanian et al. | |
| 2022/0029921 A1 | 1/2022 | Rodriguez-Natal et al. | |

OTHER PUBLICATIONS

Lee, et al., "A Design Space for Dynamic Service Level Agreements in OpenStack," Journal of Cloud Computing 2014, 3:17, Nov. 2014, 19 pages.

* cited by examiner

*Primary Examiner* — Minh Chau Nguyen
(74) *Attorney, Agent, or Firm* — Edell, Shapiro & Finnan, LLC

(57) ABSTRACT

Provided is an infrastructure for enforcing target service level parameters in a network. In one example, a network service level agreement (SLA) registry obtains one or more input service level parameters for at least one service offered by an application. Based on the one or more input service level parameters, the network SLA registry provides one or more target service level parameters to a plurality of network controllers. Each network controller of the plurality of network controllers is configured to enforce the one or more target service level parameters in a respective network domain configured to carry network traffic associated with the application.

20 Claims, 5 Drawing Sheets

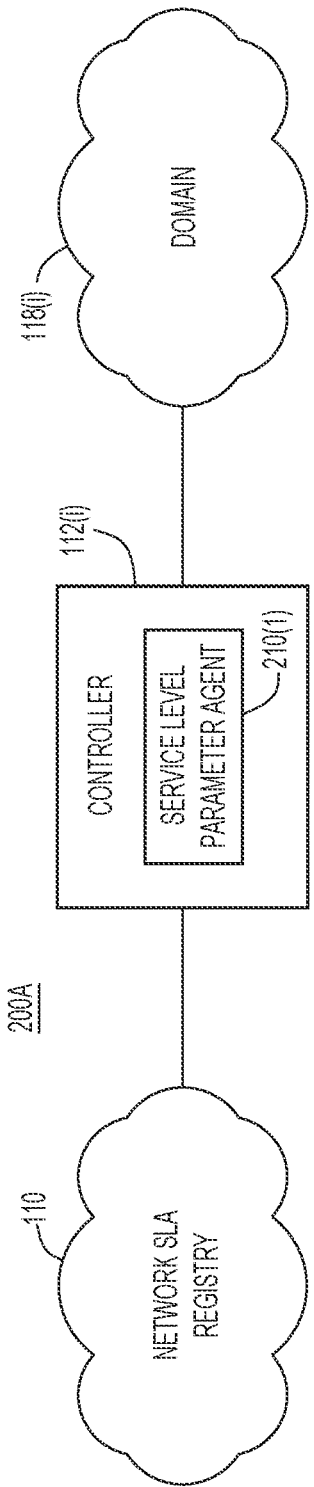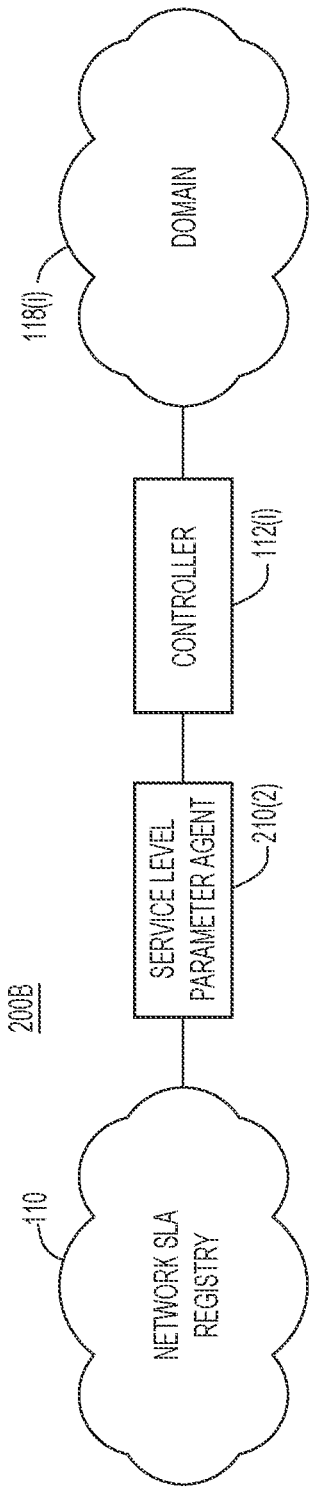

INFRASTRUCTURE FOR ENFORCING PER-APPLICATION TARGET SERVICE LEVEL PARAMETERS IN MULTI-DOMAIN NETWORKS

TECHNICAL FIELD

The present disclosure relates to computer networking technology.

BACKGROUND

An application is a set of related services offered by a software package to its users. Applications are sold by companies known as application vendors as hardware/software products hosted on premises, cloud, or as sets of fully managed services. Enterprise applications are a class of applications that are consumed by enterprise users for business or productivity reasons. An enterprise application can be hosted in a datacenter (DC), cloud, or offered by a vendor as a Software as a Service (SaaS). There is an industry trend towards hosting enterprise applications in the cloud or using SaaS for the application offered by application vendors.

BRIEF DESCRIPTION OF THE DRAWINGS

FIGS. 2A and 2B illustrate respective systems for enforcing target service level parameters using a service level parameter agent, according to example embodiments.

DETAILED DESCRIPTION

Overview

Figure 1:
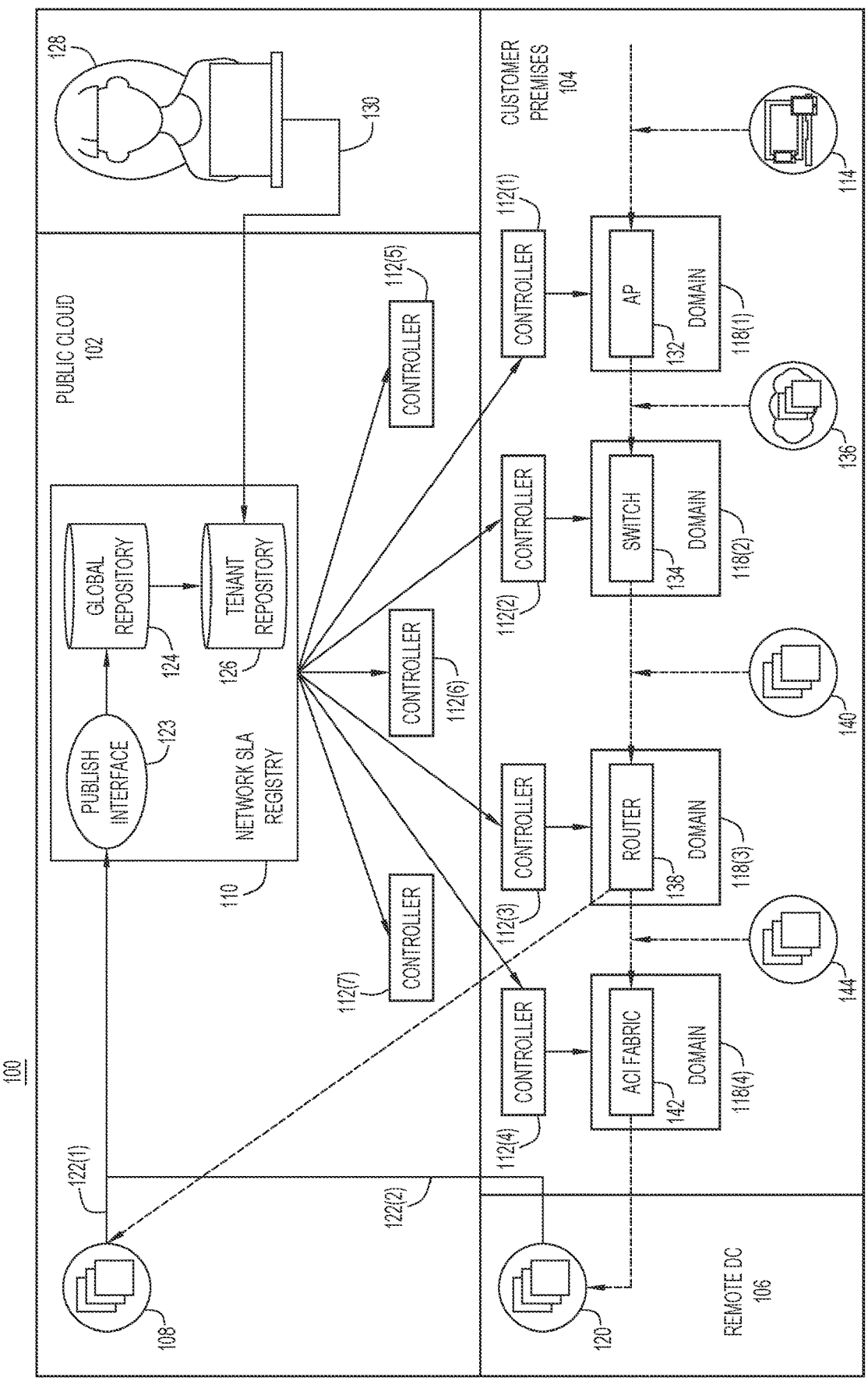
FIG. 1 illustrates a system for enforcing target service level parameters in multiple network domains, according to an example embodiment.

Provided herein is an infrastructure for enforcing target service level parameters in a network. In one example embodiment, a network service level agreement (SLA) registry obtains one or more input SLA parameters for at least one service offered by an application. Based on the one or more input SLA parameters, the network SLA registry provides one or more target SLA (service level) parameters to a plurality of network controllers. Each network controller of the plurality of network controllers is configured to enforce the one or more target service level parameters in a respective network domain configured to carry network traffic associated with the application.

Example Embodiments

User experience drives application usage and growth. For many applications, especially those that are made available via public Internet and consumed as a Software-as-a-Service (SaaS), user experience is directly tied with the state of the network that user network traffic traverses to allow the user to consume the application. As a result, network delays and packet losses can degrade user experience of applications.

To satisfy user experience targets, application vendors offer Service Level Objectives (SLOs) to their users of the application. Today, to achieve these SLOs, vendors rely on Service Level Agreements (SLAs) for compute, storage, and services provided from an infrastructure provider. The vendors also need Network SLAs (NSLAs) from the underlying network, to ensure that their users have a good experience while using the application.

For enterprise-class applications, there is little that the application vendors can do to improve the user experience of the enterprise network itself. Meanwhile, it is difficult for the enterprise network operators to optimize specific applications, as the applications cannot be meaningfully differentiated when observed from the network layer.

Further compounding the problem of optimizing application services is the fragmentation of the enterprise network into multiple solution domains (e.g., access, Cisco Systems, Inc.'s Digital Network Architecture Center (DNA-C), Software-Defined Wide Area Network (SD-WAN), DC, enterprise (e.g., Wi-Fi®) wireless, campus, core, Internet, etc.). Today, these domain controllers cannot interpret the SLA requirements for each application and render those requirements into domain-specific policies. Because of the inherently distributed nature of the network itself (between application components and users), and the multitude of vendors providing network services, it is difficult to guarantee SLA across all network domains.

Accordingly, techniques are provided herein to allow application vendors to publish one or more SLA (referred to herein as service level, for short) parameters (e.g., application network SLA requirements) that a network (e.g., an enterprise network) may consume to ensure that the SLA requirements are met. The enterprise network may enforce the SLA requirements end-to-end across its domains, as well as over the Internet, to provide enterprise application users with an optimal network experience, as targeted by the application vendors. In one example, and as described in further detail below, network domain controllers may consume a global application network SLA requirements registry configured to store the SLA requirements to render per-application policy optimizations and provide end-to-end SLA in the enterprise domain.

Provided herein is an end-to-end global network SLA infrastructure for enterprise applications. This infrastructure may enable remote enterprise application consumption with End-to-End NSLA (E2ENSLA). In other words, the enterprise network may meet the SLA requirements published by the application vendor across various network domains. The E2ENSLA provisioning solution described herein may provide an improved application experience for application users by optimizing the network.

Some enterprises may choose to obtain automatic network SLA optimization for specific application vendor traffic. The optimization may be provided end-to-end within an enterprise network for business/mission critical traffic in the network. Thus, application vendors may provide a "fast lane" to enterprise users for their applications. The optimization may be fully transparent to the enterprise.

SLA requirements may automatically be applied to any flow initiated by a device or user accessing an SLA-ensured destination. When a device is tied to a set of destinations (to consume a set of services), SLA enforcement happens automatically and implicitly for that device.

FIG. 1 illustrates a system 100 for enforcing target service level parameters in multiple network domains, according to an example embodiment. System 100 includes public cloud 102, customer (e.g., enterprise) premises 104, and remote DC 106. Public cloud 102 includes cloud-hosted application 108, network SLA registry 110, and network controllers 112(5)-112(7). Customer premises 104 includes network controllers 112(1)-112(4), user devices 114, and network domains 118(1)-118(4). Remote DC 106 includes remote DC hosted application 120.

In one example, user devices 114 will access one or more services offered by cloud-hosted application 108 or at least one service offered by remote DC hosted application 120. For this reason, cloud-hosted application 108 and remote DC hosted application 120 may be referred to as "destination applications." To access the service(s), user devices 114 may provide or obtain traffic associated with destination applications 108 or 120. The traffic may include any network packet destined to destination applications 108 or 120 or sent by destination applications 108 or 120 to user devices 114 (e.g., in response to a request).

For user devices 114 accessing the service(s) of destination applications 108 and 120, vendors of destination applications 108 and 120 may publish network SLA requirements for at least one service offered by destination applications 108 and 120. This may happen as part of the release process of the application. The services may correspond to the entire destination applications 108 and 120 or certain components thereof. The enterprise network may consume/provision the published network SLA requirements and thereby offer preferential treatment with a given SLA guarantee to the traffic associated with destination applications 108 and 120.

Network domains 118(1)-118(4) comprise a network associated with the enterprise (i.e., the enterprise network). It will be appreciated that network domains 118(1)-118(4) (and/or network controllers 112(1)-112(7)) may be provided/managed/maintained by the same network provider or by different network providers; regardless, the techniques presented herein may coordinate SLAs across the boundaries of network domains 118(1)-118(4) to provide E2ENSLA.

As represented by arrows 122(1) and 122(2), network SLA registry 110 may obtain, via publish interface 123, one or more input SLA parameters (e.g., network SLA requirements or service level parameters, for short) for at least one service offered by destination applications 108 and 120. The input service level parameter(s) may be expressed as exact values (e.g., 10 Mbps), as a range (e.g., 5-10 Mbps), or in any other suitable form. Network SLA registry 110 may also obtain application information (e.g., access information) that identifies destination applications 108 or 120 and can be used to correlate the input service level parameter(s) with destination applications 108 or 120. It is to be understood that obtaining the one or more service level parameters and obtaining the application information may be achieved via a "pull" model or a "push" model, and thus "obtaining" is meant to cover both the pull model and the push model. The access information may include an indication of a unique identifier of the service (e.g., Fully Qualified Domain Name(s) (FQDN(s)), Internet Protocol (IP) addresses, Uniform Resource Identifiers (URIs), etc.). Because a given application may have multiple different services each with different SLA requirements and different FQDNs/IP addresses/URLs, network SLA registry 110 may obtain multiple such indications for each of destination applications 108 and 120. Network SLAS registry 110 may obtain the input service level parameter(s), and any access information, from the vendors of destination applications 108 and 120.

In some examples, application vendors may publish the input service level parameter(s) and/or application information as part of the application deployment process. The application vendor may publish the input service level parameter(s) over Hypertext Transfer Protocol (HTTP), HTTP Secure (HTTPS), WebSocket, a publish subscribe tool such as Kafka, RabbitMQ, etc., and/or using a standard. In one specific example, the application vendor may publish an SLA document that defines an SLA guarantee for the service(s) accessed from within the enterprise network.

In adaptive streaming use cases, for e.g. HTTP Live Streaming (HLS) or Dynamic Adaptive Streaming over HTTP (DASH), a workflow may be created to auto-populate tenant repository 126, or global repository 124 (based on if the enterprise is hosting the adaptive streaming, or a third party is providing adaptive streaming to multiple enterprises) when new stream is provisioned. In this use case, the streaming manifest files may include network SLA requirements.

Network SLA registry 110 may store the input service level parameter(s), and any access information, in global repository 124. Global repository 124 may be a vendor application information database hosted in network SLA registry 110. Global repository 124 may be an independent service/product that may be integrated with network controllers 112(1)-112(7). For example, global repository 124 may be a central registry configured to contain all input service level parameters obtained from all vendors.

Based on the input service level parameter(s), network SLA registry 110 may store one or more target service level parameter(s) in tenant repository 126. Tenant repository 126 may be a repository associated with an enterprise. For example, tenant repository 126 may be configured to store the input service level parameters that are relevant for the enterprise (e.g., the input service level parameters associated with services/applications that are used by the enterprise). The enterprise may request the network SLA registry 110 to create tenant repository 126.

In one example, network SLA registry 110, acting as an SLA registry service, may populate the application global SLA values from global repository 124 into tenant repository 126 as customer tenant SLA values. In some examples, the SLA values stored in global repository 124 may be the same values stored in tenant repository 126. For instance, the network SLA registry 110 may copy global application registry values periodically to each tenant repository (e.g., tenant repository 126) to keep the tenant repositories synchronized with global repository 124.

In other examples, the values may differ. For instance, network SLA registry 110 may store modified or additional SLA values in tenant repository 126 based on input obtained from network administrator 128. As illustrated by arrow 130, network SLA registry 110 may obtain an indication, from network administrator 128, to modify the input service level parameter(s) and/or of one or more network administrator defined target service level parameters. In response to obtaining the indication, network SLA registry 110 may generate the target service level parameter(s) based on the input service level parameter(s) and/or to include the one or more network administrator defined target service level parameters in tenant repository 126, as appropriate.

Thus, in the absence of vendor-defined SLA parameters, network administrator 128 may create SLA documents (e.g., including application information and/or SLA requirements) on behalf of destination applications 108 and/or 120. Network administrator 128 may publish new SLA requirements and/or modify SLA requirements for a tenant environment (e.g., for a specific enterprise). Network administrator 128 may add new SLA requirements when an application vendor does not have the ability to do so or chooses not to publish network SLA requirements. Network administrator 128 may modify/override/update (e.g., upgrade/downgrade) the network SLA requirements published by the application vendor based on the capabilities of the enterprise network and/or other enterprise-specific factors (e.g., cost). Network administrator 128 may also modify the network SLA requirements for independent network control domains.

Network administrator 128 may be an Information Technology (IT) network administrator associated with the enterprise, a Development Operations (DevOps) network administrator, a Network Operations (NetOps) network administrator, etc. If network administrator 128 is associated with the enterprise, network administrator 128 may be permitted to perform Create, Read, Update, and Delete (CRUD) operations for a specific enterprise (e.g., the enterprise that network administrator 128 is associated with). In this case, network administrator 128 may publish application information and/or SLA requirements directly in tenant repository 126, but will be prohibited from modifying the global SLA values stored in global repository 124.

Network SLA registry 110 may provide the target service level parameter(s) stored in tenant repository 126 to network controllers 112(1)-112(7). Network controllers 112(1)-112(4) are on-prem (i.e., located in customer premises 104), and may also be referred to as "enterprise network controllers." Network controllers 112(5)-112(7) are cloud-based (i.e., located in public cloud 102), and may be offered as a SaaS, web service, etc. In one specific example, at least one of network controllers 112(5)-112(7) may be a Cisco Systems, Inc. Meraki network controller.

In the example shown in FIG. 1, each of network controllers 112(1)-112(7) may be subscribed (e.g., may auto-subscribe) to tenant repository 126, and network SLA registry 110 may publish the target service level parameter(s) to network controllers 112(1)-112(7). In another example, a subset of network controllers 112(1)-112(7) may be subscribed to tenant repository 126, network SLA registry 110 may publish the target service level parameter(s) to the subset of network controllers 112(1)-112(7), and the subset of network controllers 112(1)-112(7) may in turn publish the target service level parameter(s) to the unsubscribed ones of network controllers 112(1)-112(7). Network SLA registry 110 may publish the target service level parameter(s) to one or more of network controllers 112(1)-112(7) using any suitable publish-subscribe ("pub-sub") mechanism.

Network controllers 112(1)-112(4) are configured to enforce the target service level parameter(s) in network domains 118(1)-118(4), respectively. Network domains 118(1)-118(4) are configured to carry network traffic associated with destination applications 108 and/or 120. Once network controllers 112(1)-112(7) have been made aware of the target service level parameter(s) (e.g., via tenant repository 126), network controllers 112(1)-112(4) may enforce the target service level parameter(s) in network domains 118(1)-118(4) to ensure E2ENSLA is met in the network paths between user devices 114 and destination applications 108 and/or 120.

Network controller 112(1) may be a Wireless Local Area Network (LAN) Controller (WLC), and network domain 118(1) may comprise a Wireless LAN (WLAN). Network domain 118(1) includes at least one Access Point (AP) 132.

Network controller 112(2) may be a Cisco Systems, Inc. Digital Network Architecture Center (DNA-C) controller, and network domain 118(2) may comprise a software-defined access fabric. Network domain 118(2) includes at least one switch 134 (e.g., an access switch). In one example, edge application 136 may be deployed over network domain 118(2).

Network controller 112(3) may be a Cisco Systems, Inc. vManage controller, and network domain 118(3) may comprise a Software-Defined Wide Area Network (SD-WAN). Network domain 118(3) includes at least one router 138. In one example, application 140 may be deployed over network domain 118(3). Application 140 may be hosted by an on-prem DC, which may be a different DC than remote DC 106.

Network controller 112(4) may be a Cisco Systems, Inc. Application Policy Infrastructure Controller (APIC), and network domain 118(4) may comprise a Cisco Systems, Inc. Application Centric Infrastructure (ACI) fabric 142. ACI fabric 142 may include a plurality of switches. In one example, application 144 may be deployed over network domain 118(4). The first application may be hosted by an on-prem DC.

Network controllers 112(1)-112(4) may consume SLA information advertised from tenant repository 126 to enforce SLA requirements E2E (e.g., at every network hop between user devices 114 and destination applications 108 and/or 120). Upon receiving the application information and target SLA requirements, network controllers 112(1)-112(4) may manage traffic through network domains 118(1)-118(4). Network controllers 112(1)-112(4) may provision network policies in network domains 118(1)-118(4) based on the application destination(s) published by the vendor (e.g., the access information) and associated, target SLA requirements for the destination host or service (e.g., destination applications 108 and/or 120).

Network controllers 112(1)-112(4) may enforce SLA requirements in network domains 118(1)-118(4) by pushing the relevant SLA policies/configurations to network domains 118(1)-118(4). Network controllers 112(1)-112(4) may thereby create an SLA-bound network that guarantees deterministic SLA parameters at each network layer and thereby provides E2ENSLA. That is, an SLA-bound network may extend from user devices 114 to public cloud 102 (for destination application 108) and/or remote DC 106 (for destination application 120). Thus, network controllers 112(1)-112(4) may enforce the data plane policy at the network layer for each one of network domains 118(1)-118(4).

Network controllers 112(1)-112(4) may enforce network SLA requirements using any suitable mechanism. For example, network controllers 112(1)-112(4) may involve selecting a best path for network traffic, provisioning dedicated underlays having some guaranteed bandwidth, marking Differentiated Services Code Point (DSCP) bits for differentiated Quality of Service (QoS) across the network, assigning certain network traffic to low-interference channels, etc.

For example, network controller 112(1) may employ SLA Wireless (SLAW) techniques in network domain 118(1) to offer improved queuing mechanisms for user devices 114 in accordance with the target SLA requirements. Network controller 112(1) may, for instance, assign user devices 114 accessing destination applications 108 and/or 120 to high-priority queues. User devices 114 may also/alternatively access destination applications 108 and/or 120 through one or more dedicated channels. A modified version of Application WAN Interface (AWI) may be used for the network domain 118(1).

As another example, network controller 112(3) may use AWI-based software to provision a dedicated underlay at the SDWAN/Multi-Site Orchestrator (MSO) layer based on an application SLA requirement. The underlay may guarantee that the SLA requirements are met, as the underlay providers and first mile connectivity allows. Network controller 112(3) may provision an SLA-defined underlay (for both private and public IP addresses) to route any network traffic destined for destination applications 108 and/or 120.

In one example, one of user devices 114 may send a network packet to destination application 108 via AP 132, switch 134, and router 138. When the packet arrives at each of those network devices at the device layer, the network device may determine how to transmit the packet based on the destination of the packet. The destination of the packet may be determined in any suitable manner. In one example, the network device may apply E2ENSLA by transmitting the packet based on the destination FQDN/URL (e.g., the FQDN of destination application 108 or a specific service thereof). For instance, a packet processing module in the network device may identify the destination IP address of the packet and based on the destination IP address, ascertain how to treat the packet in accordance with the network SLA guarantee. A DNS query may map the destination FQDN to the destination IP address. The network device may route the packet based on the destination FQDN, which was published by the application vendor and provided by SaaS 110 (with the target service level parameters) to network controllers 112(1)-112(3). Thus, in this example, each network domain 118(1)-118(3) may identify the destination FQDN/URL and route the packet accordingly (e.g., based on the destination IP address/FQDN/URL and the target service level parameters). In another example, the network devices may transmit the packet based on the Layer 7 (L7) hostname, for which a corresponding FQDN is known.

Similarly, one of user devices 114 may send a network packet to destination application 120 via AP 132, switch 134, router 138, and ACI fabric 142. When the packet arrives at each of those network devices at the device layer, the network device may determine how to transmit the packet based on the destination of the packet (e.g., based on the destination FQDN) and route the packet to destination application 120 accordingly.

Destination applications 108 and 120 may have different target service level parameters. Therefore, the network devices may transmit packets differently. For example, if tenant repository 126 indicates that destination application 108 is associated with more stringent SLA parameters than destination application 120, the network devices may treat the packet destined for destination application 108 as higher priority than packets destined for destination application 120. It will be appreciated that the network devices can similarly route network packets obtained from destination applications 108 and/or 120 based on the source IP address/FQDN/URL of the network packets and the target service level parameters.

Destination applications 108 and/or 120 may be composite, with multiple endpoints and offered services. Multiple service endpoints belonging to one of destination applications 108 and/or 120 may have different SLA requirements. The techniques described herein may enable base SLA parameters for an application FQDN and different SLA parameters for service endpoints. The service endpoint SLA parameters may be maintained at an external access layer (e.g., SD-WAN) when services are expressed in terms of URLs (e.g., rather than independent FQDNs).

With continuing reference to FIG. 1, FIGS. 2A and 2B illustrate respective systems 200A and 200B for enforcing target service level parameters using a service level parameter agent 210(1) or 210(2), according to example embodiments. Systems 200A and 200B include network SLA registry 110, network controller 112(i), and domain 118(i). Systems 200A and 200B also include service level parameter agents 210(1) and 210(2), respectively. In FIG. 2A, service level parameter agent 210(1) is located in controller 112(i), whereas in FIG. 2B, service level parameter agent 210(1) is located between SaaS 110 and controller 112(i).

In one example, network SLA registry 110 may provide the target service level parameters to network controller 112(i) using service level parameter agents 210(1) and/or 210(2). In the example of FIG. 2A, network controller 112(i) may receive application/SLA information through service level parameter agent 210(1), which is running on network controller 112(i) and has subscribed to certain vendor-defined application network SLA requirements. In an alternate deployment mode, as shown in FIG. 2B, service level parameter agent 210(2) may run external to network controller 112(i), subscribe to the vendor-defined SLA requirements in tenant repository 126, and program network controller 112(i) for SLA enforcement. In either case, with the help of service level parameters agents 210(1) and/or 210(2), controller 112(i) may retrieve the information in real-time and enforce the target service level parameters associated with a destination application throughout an enterprise network.

Service level parameters agents 210(1) and/or 210(2) may program network controller 112(i) for SLA enforcement at the network device layer. If network controller 112(i) supports Application WAN Interface (AWI), the interfaces provided by AWI may be used to network controller 112(i) for the SLA. It will be appreciated that service level parameter agents 210(1) and 210(2) may assist any suitable quantity of network controllers 112(i) in obtaining the target service level parameters.

Figure 3:
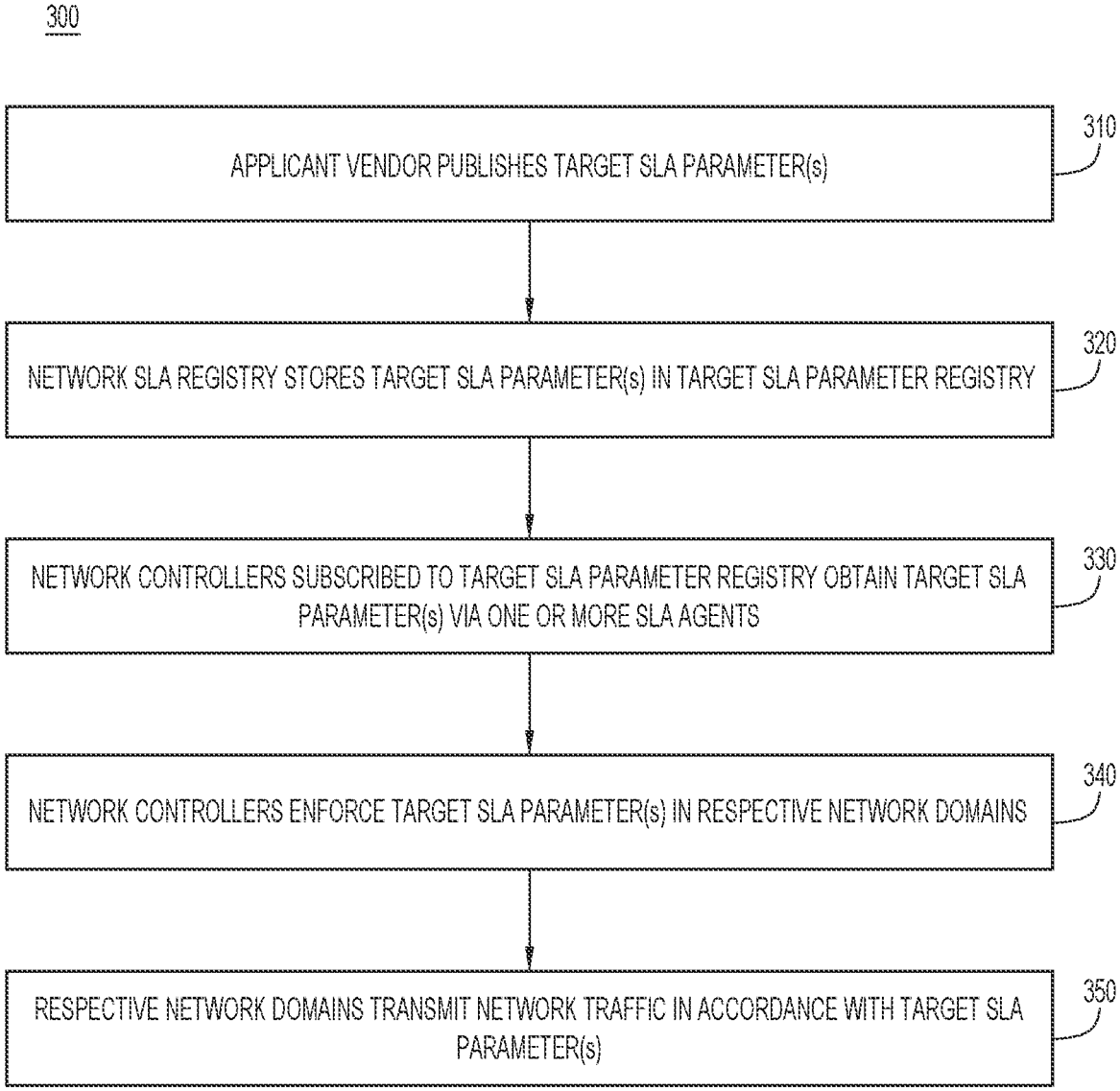
FIG. 3 illustrates a flowchart of a method for enforcing target service level parameters in multiple network domains, according to an example embodiment.

FIG. 3 illustrates a flowchart of a method 300 for enforcing target service level parameters in multiple network domains, according to an example embodiment. At operation 310, an application vendor publishes target SLA parameters for a destination application. At operation 320, a network SLA registry stores the target SLA parameters in a target SLA parameter registry. At operation 330, one or more network controllers subscribed to the target SLA parameter registry obtain the target SLA parameters via one or more SLA agents. At operation 340, the network controllers enforce the target SLA parameters in respective network domains. At operation 350, the respective network domains transmit network traffic in accordance with the target SLA parameters.

Figure 4:
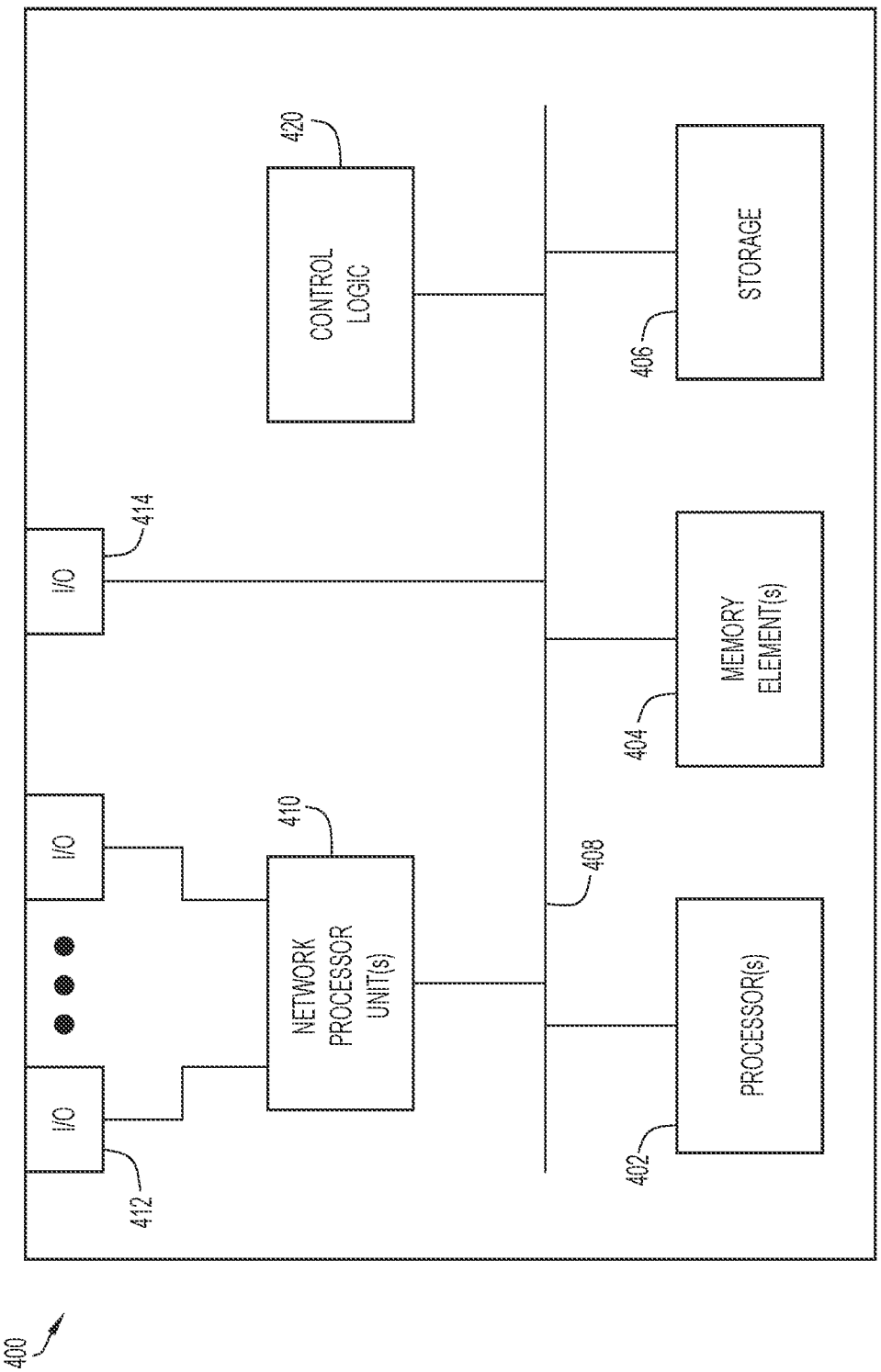
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1, 2A, 2B, and 3. In various embodiments, a computing device, such as computing device 400 or any combination of computing devices 400, may be configured as any entity/entities as discussed for the techniques depicted in connection with FIGS. 1, 2A, 2B, and 3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
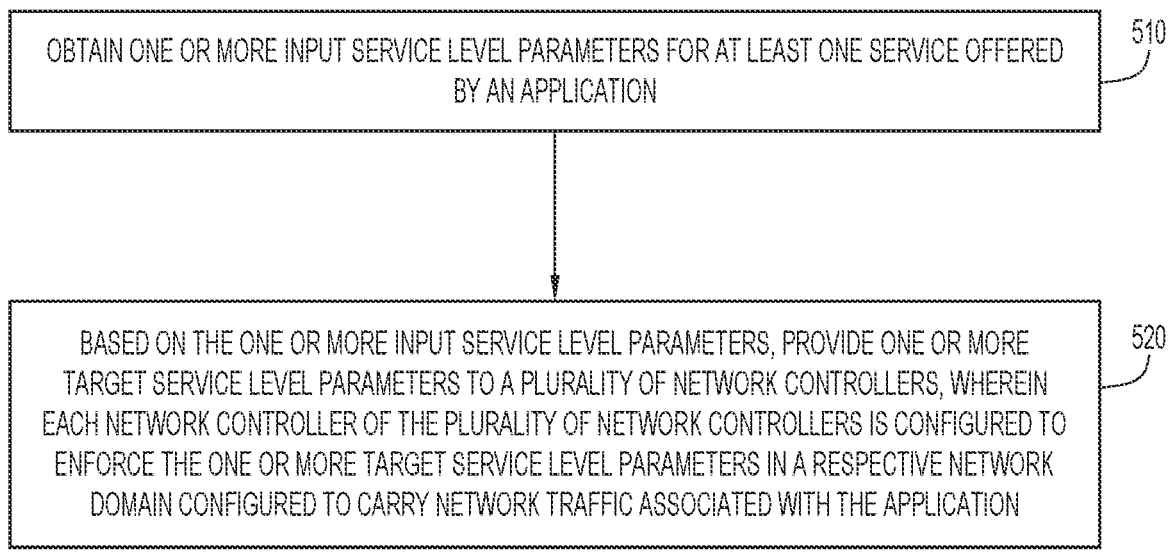
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as network SLA registry 110 (e.g., comprising one or more servers). At operation 510, one or more input service level parameters for at least one service offered by an application are obtained. At operation 520, based on the one or more input service level parameters, one or more target service level parameters are provided to a plurality of network controllers. Each network controller of the plurality of network controllers is configured to enforce the one or more target service level parameters in a respective network domain configured to carry network traffic associated with the application.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: obtaining one or more input service level parameters for at least one service offered by an application; and based on the one or more input service level parameters, providing one or more target service level parameters to a plurality of network controllers, wherein each network controller of the plurality of network controllers is configured to enforce the one or more target service level parameters in a respective network domain configured to carry network traffic associated with the application.

In one example, the respective network domains comprise a network associated with an enterprise.

In one example, the method further comprises: storing the one or more input service level parameters in a global repository; and based on the one or more input service level parameters, storing the one or more target service level parameters in a repository associated with an enterprise.

In one example, the method further comprises: obtaining, from a network administrator, an indication to generate the one or more target service level parameters based on the one or more input service level parameters; and in response to obtaining the indication, generating the one or more target service level parameters based on the one or more input service level parameters.

In one example, the method further comprises: obtaining, from a network administrator, an indication of one or more network administrator defined target service level parameters; and in response to obtaining the indication, generating the one or more target service level parameters, wherein the one or more target service level parameters include the one or more network administrator defined target service level parameters.

In one example, the method further comprises: obtaining the one or more input service level parameters from a vendor of the application.

In one example, the method further comprises: providing the one or more target service level parameters to the plurality of network controllers using one or more service level parameter agents.

In another form, an apparatus is provided. The apparatus comprises: a network interface configured to obtain or provide network communications; and one or more processors coupled to the network interface, wherein the one or more processors are configured to: obtain one or more input service level parameters for at least one service offered by an application; and based on the one or more input service level parameters, provide one or more target service level parameters to a plurality of network controllers, wherein each network controller of the plurality of network controllers is configured to enforce the one or more target service level parameters in a respective network domain configured to carry network traffic associated with the application.

In another form, one or more non-transitory computer readable storage media are provided. The non-transitory computer readable storage media are encoded with instructions that, when executed by a processor, cause the processor to: obtain one or more input service level parameters for at least one service offered by an application; and based on the one or more input service level parameters, provide one or more target service level parameters to a plurality of network controllers, wherein each network controller of the plurality of network controllers is configured to enforce the one or more target service level parameters in a respective network domain configured to carry network traffic associated with the application.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining one or more input service level parameters for at least one service offered by an application; and
   based on the one or more input service level parameters, providing one or more target service level parameters to a plurality of network controllers,
   wherein each network controller of the plurality of network controllers is configured to enforce the one or more target service level parameters in a respective network domain configured to carry network traffic associated with the application.

2. The method of claim 1, wherein each respective network domain comprises a network associated with an enterprise.

3. The method of claim 1, further comprising:
   storing the one or more input service level parameters in a global repository; and based on the one or more input service level parameters, storing the one or more target service level parameters in a repository associated with an enterprise.

4. The method of claim 1, further comprising:
obtaining, from a network administrator, an indication to generate the one or more target service level parameters based on the one or more input service level parameters; and
in response to obtaining the indication, generating the one or more target service level parameters based on the one or more input service level parameters.

5. The method of claim 1, further comprising:
obtaining, from a network administrator, an indication of one or more network administrator defined target service level parameters; and
in response to obtaining the indication, generating the one or more target service level parameters, wherein the one or more target service level parameters include the one or more network administrator defined target service level parameters.

6. The method of claim 1, further comprising:
obtaining the one or more input service level parameters from a vendor of the application.

7. The method of claim 1, further comprising:
providing the one or more target service level parameters to the plurality of network controllers using one or more service level parameter agents.

8. An apparatus comprising:
a network interface configured to obtain or provide network communications; and
one or more processors coupled to the network interface, wherein the one or more processors are configured to:
obtain one or more input service level parameters for at least one service offered by an application; and
based on the one or more input service level parameters, provide one or more target service level parameters to a plurality of network controllers,
wherein each network controller of the plurality of network controllers is configured to enforce the one or more target service level parameters in a respective network domain configured to carry network traffic associated with the application.

9. The apparatus of claim 8, wherein each respective network domain comprises a network associated with an enterprise.

10. The apparatus of claim 8, wherein the one or more processors are further configured to:
store the one or more input service level parameters in a global repository; and
based on the one or more input service level parameters, store the one or more target service level parameters in a repository associated with an enterprise.

11. The apparatus of claim 8, wherein the one or more processors are further configured to:
obtain, from a network administrator, an indication to generate the one or more target service level parameters based on the one or more input service level parameters; and
in response to obtaining the indication, generate the one or more target service level parameters based on the one or more input service level parameters.

12. The apparatus of claim 8, wherein the one or more processors are further configured to:
obtain, from a network administrator, an indication of one or more network administrator defined target service level parameters; and
in response to obtaining the indication, generate the one or more target service level parameters, wherein the one or more target service level parameters include the one or more network administrator defined target service level parameters.

13. The apparatus of claim 8, wherein the one or more processors are further configured to:
obtain the one or more input service level parameters from a vendor of the application.

14. The apparatus of claim 8, wherein the one or more processors are further configured to:
provide the one or more target service level parameters to the plurality of network controllers using one or more service level parameter agents.

15. One or more non-transitory computer readable storage media encoded with instructions that, when executed by a processor, cause the processor to:
obtain one or more input service level parameters for at least one service offered by an application; and
based on the one or more input service level parameters, provide one or more target service level parameters to a plurality of network controllers,
wherein each network controller of the plurality of network controllers is configured to enforce the one or more target service level parameters in a respective network domain configured to carry network traffic associated with the application.

16. The one or more non-transitory computer readable storage media of claim 15, wherein each respective network domain comprises a network associated with an enterprise.

17. The one or more non-transitory computer readable storage media of claim 15, wherein the instructions further cause the processor to:
store the one or more input service level parameters in a global repository; and
based on the one or more input service level parameters, store the one or more target service level parameters in a repository associated with an enterprise.

18. The one or more non-transitory computer readable storage media of claim 15, wherein the instructions further cause the processor to:
obtain, from a network administrator, an indication to generate the one or more target service level parameters based on the one or more input service level parameters; and
in response to obtaining the indication, generate the one or more target service level parameters based on the one or more input service level parameters.

19. The one or more non-transitory computer readable storage media of claim 15, wherein the instructions further cause the processor to:
obtain, from a network administrator, an indication of one or more network administrator defined target service level parameters; and
in response to obtaining the indication, generate the one or more target service level parameters, wherein the one or more target service level parameters include the one or more network administrator defined target service level parameters.

20. The one or more non-transitory computer readable storage media of claim 15, wherein the instructions further cause the processor to:
obtain the one or more input service level parameters from a vendor of the application.

* * * * *